United States Patent [19]
Lambert

[11] 4,213,671
[45] Jul. 22, 1980

[54] FIBER OPTIC CONNECTORS AND METHODS OF AFFIXING OPTICAL FIBERS THERETO

[75] Inventor: Gary M. Lambert, Berlin, Mass.

[73] Assignee: GTE Laboratories Incorporated, Waltham, Mass.

[21] Appl. No.: 19,961

[22] Filed: Mar. 12, 1979

[51] Int. Cl.³ .............................................. G02B 5/14
[52] U.S. Cl. ..................... 350/96.21; 350/320
[58] Field of Search ................. 350/96.20, 96.21, 96.22

[56] References Cited

U.S. PATENT DOCUMENTS

| | | | |
|---|---|---|---|
| 3,902,784 | 9/1975 | Dakss et al. | 350/81 |
| 3,999,841 | 12/1976 | Dakss et al. | 350/320 |
| 4,088,386 | 5/1978 | Hawk | 350/96.21 |
| 4,111,522 | 9/1978 | Auracher et al. | 350/96.21 |
| 4,142,776 | 3/1979 | Cherin et al. | 350/96.21 |
| 4,146,299 | 3/1979 | Wellington et al. | 350/96.21 |

FOREIGN PATENT DOCUMENTS

| | | | |
|---|---|---|---|
| 2525132 | 1/1977 | Fed. Rep. of Germany | 350/96.21 |
| 2731863 | 2/1978 | Fed. Rep. of Germany | 350/96.21 |
| 1470901 | 4/1977 | United Kingdom | 350/96.21 |

OTHER PUBLICATIONS

Dalgleish et al., "Optical-Fibre Connector," *Electronics Letters*, vol. 11, No. 1, Jan. 1975, pp. 24–26.

*Primary Examiner*—John K. Corbin
*Assistant Examiner*—John D. Lee
*Attorney, Agent, or Firm*—Fred Fisher

[57] ABSTRACT

A fiber optic connector includes a first connector body, an associated first end cap means, a second connector body and an associated second end cap means. A longitudinal groove is provided along a fiber engaging face of the first connector body. A plurality of transverse slots are spaced along the groove. Reference means are associated with the groove for indicating where a face of a first fiber to be coupled should be aligned. The first end cap means has a longitudinal protuberance along a face which engages a portion of the first connector body, the protuberance corresponding in size and shape to the groove. A plurality of transverse inverted fingers are spaced along the protuberance. The second connector body has a longitudinal protuberance along a fiber engaging face with a plurality of transverse inverted fingers spaced therealong. Reference means are associated with the second body protuberance for indicating where a face of a second fiber to be coupled should be aligned. The second end cap means has a raised longitudinal extension with a groove therein along a face for engaging a portion of the second connector body. A plurality of transverse slots are spaced along the second end cap means groove. Upon proper mating of the two connector bodies, body engaging means associated with each connector body engage the corresponding mated body.

4 Claims, 3 Drawing Figures

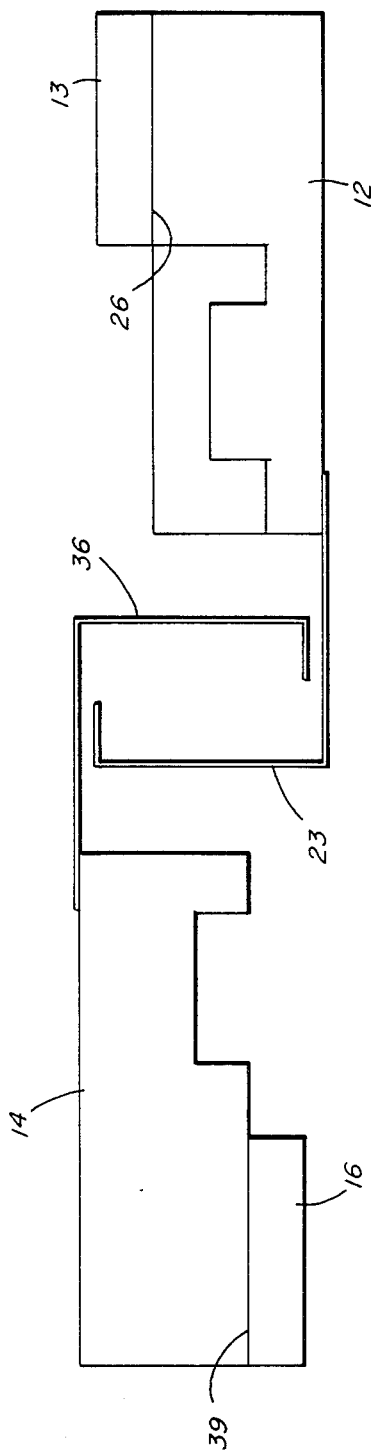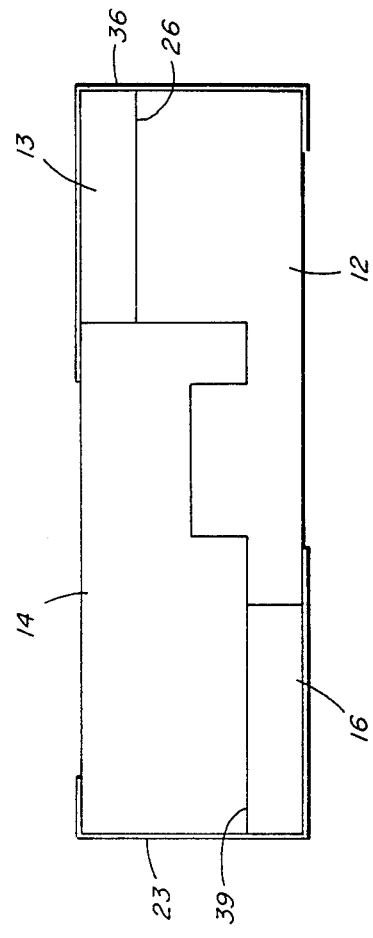

FIBER OPTIC CONNECTORS AND METHODS OF AFFIXING OPTICAL FIBERS THERETO

BACKGROUND OF THE INVENTION

1. Field of the Invention

This invention relates to fiber optic connectors, and to methods of affixing optical fibers thereto. Accordingly, it is a general object of this invention to provide new and improved connectors and methods of such character.

2. Description of the Prior Art

Spring means and screw means have been used for biasing an optical fiber connector against the operative surfaces of a V-groove channel, as set forth in greater detail in U.S. Pat. No. 3,902,784, entitled "Apparatus for Forming an Optical Fiber Connector," issued to Mark Dakss et al on Sept. 2, 1975. Similar material appears in a division thereof, U.S. Pat. No. 3,999,841 entitled "Method for Forming an Optical Fiber Connector," issued Dec. 28, 1976.

The presence of a V-groove channel without more, does not assure proper alignment of an optical fiber.

SUMMARY OF THE INVENTION

Another object of the invention is to provide for new and improved fiber optic connectors and methods of affixing optical fibers thereto so that such optical fibers are properly aligned.

Yet another object of the invention is to provide new and improved optical connector bodies which can be simply coupled together with the associated optical fibers in proper alignment.

Still another object of the invention is to provide an inexpensive, easy to manufacture, optical connector.

Still yet another object of the invention is to provide for a new and improved, easy to assemble, method of affixing optical fibers to optical connector parts.

Another object of the invention is to provide new and improved parts and procedures for assembling optical fibers to an optical connector which obviate the requirement for high precision parts and critical assembly procedures.

In accordance with one embodiment of the invention, a fiber optic connector includes a first connector body, an associated first end cap means, a second connector body and an associated second end cap means. A longitudinal groove is provided along a fiber engaging face of the first connector body. A plurality of transverse slots are spaced along the groove. Reference means are associated with the groove for indicating when a face of a first fiber to be coupled should be aligned. The first end cap means has a longitudinal protuberance along a face which engages a portion of the first connector body, the protuberance corresponding in size and shape to the groove. A plurality of transverse inverted fingers are spaced along the protuberance. The second connector body has a longitudinal protuberance along a fiber engaging face with a plurality of transverse inverted fingers spaced therealong. Reference means are associated with the second body protuberance for indicating where a face of a second fiber to be coupled should be aligned. The second end cap means has a raised longitudinal extension with a groove therein along a face for engaging a portion of the second connector body. A plurality of transverse slots are spaced along the second end cap means groove. Upon proper mating of the two connector bodies, body engaging means associated with each connector body engage the corresponding mated body. In accordance with certain features of the invention, the groove on the first connector body can be recessed and V-shaped, and the transverse slots spaced along therein are rectangular. The protuberance on the first end cap means is extended and V-shaped. The fingers on the first end cap means are rectangular and V-shaped. The protuberance along the face of the second connector body is extended and V-shaped, and the fingers spaced there along are rectangular and V-shaped. The groove in the second end cap means is V-shaped. The associated transverse slots are rectangular, and are extended to a depth beyond the V-shape groove of the second end cap means.

In accordance with another embodiment of this invention, fibers can be affixed to such a connector by orienting one fiber within the first connector body longitudinal recessed groove and aligning it so that a face thereof is aligned with the first connector body reference means. Epoxy is applied to the first fiber within the groove of the first connector body. The first end cap means is applied to engage the first connector body so that the epoxy joins the first end cap means to the first fiber, and the epoxy joins the first fiber to the first connector body. The second fiber is oriented within the second connector body V-shaped fingers. The second fiber is aligned so that a face thereof is aligned with the second connector body reference means. Epoxy is applied to the second fiber within the second connector body V-shaped fingers. The second end cap means is applied to engage the second connector body so that the epoxy joins the second end cap means to the second fiber, and the epoxy joins the second fiber to the second connector body.

BRIEF DESCRIPTION OF THE DRAWING

Other objects, advantages, and features of this invention, together with its construction and mode of operation, will become more apparent from the following description, when read in conjunction with the accompanying drawing in which:

FIG. 2 is a side view of the embodiment of FIG. 1, with spring clips shown, showing the first connector body and the first end cap means joined together, but separated from the joined together combination of the second connector with the second end cap means, and FIG. 3 is a side view of the embodiment of FIG. 1 with the components coupled together.

DESCRIPTION OF THE PREFERRED EMBODIMENTS

Figure 1:
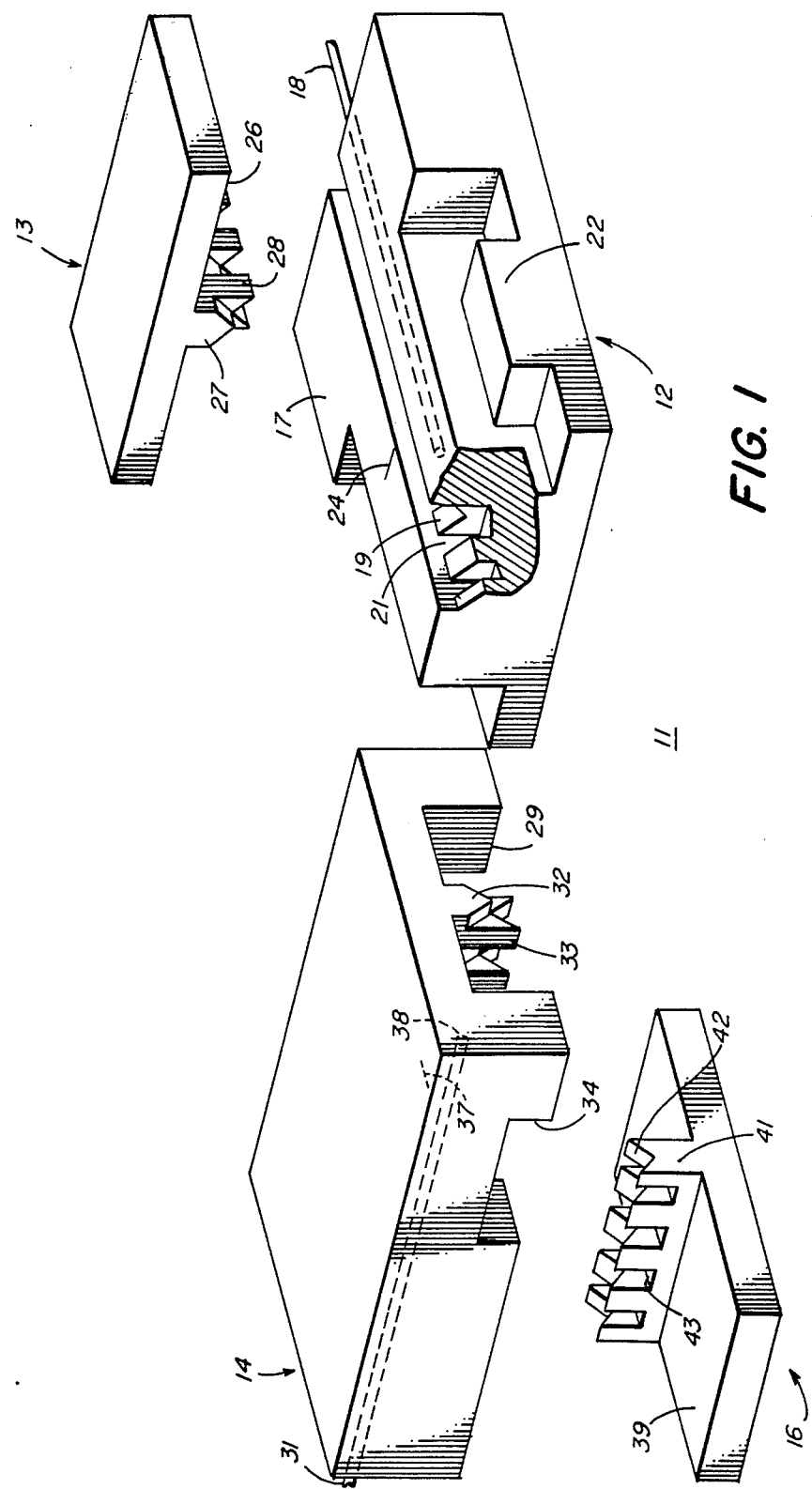
FIG. 1 is an exploded view, partly in section, of one embodiment of the invention showing a first connector body, an associated first end cap means, a second connector body, and a second end cap means, with spring clips deleted.

Referring to FIG. 1, there is shown an exploded view of a fiber optic connector, partly in sections in accordance with a preferred embodiment of the invention. The connector 11 includes a first connector body 12, an associated first end cap means 13, a second connector body 14, and a second end cap means 16.

The first connector body 12 has a face 17 upon which a first fiber 18 to be coupled will be engaged. A longitudinal recessed V-shaped groove 19 is provided along the face 17 of the connector body 12. A plurality of rectangular transverse slots 21 are spaced along the groove 19, the slots 21 extending to a depth exceeding that of the groove 19. The body 12 has an engaging section 22 formed as will become more apparent hereinafter. A spring clip 23 is affixed to the body 12 as will become more apparent hereinafter. Reference means, such as a line 24 or other indicium associated with the groove 19, indicates where the face 26 of the fiber 18 is to be aligned.

The end cap 13 has a face 26 for engaging a portion of the connector body 12, as indicated at FIG. 2. A longitudinally extended V-shaped protuberance 27 is provided along the engaging face 26, the protuberance 27 corresponding in size and shape to the recessed groove 19.

The protuberance 27 is provided with a plurality of rectangular transverse inverted V-shaped fingers 28 spaced therealong. The fingers 28 are of such a length that they do not exceed the depth of the transverse slots 21.

The second connector body 14 has a face 29 upon which a second fiber 31 to be coupled will be engaged. A longitudinal extended V-shaped protuberance 32 is provided along the face 29 of the connector body 14. A plurality of rectangular transverse inverted V-shaped fingers 33 are spaced along the protuberance 32, the fingers 33 extending a distance beyond the protuberance 32. The connector body 14 includes a body engaging portion 34 adapted to engage with the engaging section 22 of the body 12 when the two bodies 12 and 14 are brought together and the engaging portions 22 and 34 are in proper alignment. A spring clip 36 is affixed to the body 14 as will become more apparent hereinafter. Reference means, such as a line 37 or other indicium associated with the protuberance 32, indicates where the face 38 of the fiber 31 is to be aligned.

The end cap 16 has a face 39 for engaging a portion of the connector body 14, as indicated at FIG. 2. A raised longitudinal extension 41 has a V-shaped groove 42 therein along the face 39. A plurality of rectangular transverse slots 43 are spaced along, and extend to a depth beyond, the V-shaped groove 42.

Upon proper mating of the two bodies 12 and 14, the first engaging portion 22 engages with the second engaging portion 34, the first spring clip 23 affixed to the body 12 engages about the second end cap 16 and clips the second connector body 14; the second spring clip 36 affixed to the second body 14 engages about the first end cap 13 and clips about the first connector body 12.

The connector 11, in summary, is a snap together device which uses a V-groove-winged finger clamp to rigidly align the fibers. It is constructed of two halves which are mechanically polarized. Each half is composed of a molded plastic body 12 or 14, a molded plastic end cap 13 or 16, and a spring clip 23 or 36. The body 12, 14 has either a V-groove 19 or a winged finger 32, 33 (respectively) molded into its entire length. A cleaved fiber 18, 13 is placed into this groove and is gauged with respect to a reference line 24, 37 on the body 12, 14 with an appropriate tool. The end cap 13, 16 which contains a mating finger 27, 28 or V-groove 42 is then snapped into place to hold the fiber 18, 31 securely. Fast setting epoxy is preferably used to permanently secure the fiber, end cap, and body together.

Once properly attached to the fiber ends, the connector halves (including their respective bodies and end caps) need only be snapped together to complete the connection. The action of the spring clips 23, 36 is two fold: First, they act to press the reference surfaces of the connector halves together which align the fibers in the longitudinal direction (end separation). Second, they press the fingers and V-groove together which align the fibers in both the transverse and angular orientations.

In accordance with the invention, fiber optic connectors can be easily constructed and optical fibers can be conveniently affixed thereto. The connectors utilize easily moldable parts which are relatively inexpensive to manufacture. Assembly is simplified. High precision parts and critical assembly procedures are elminated due to the V-groove-winged finger clamp combination. The fiber ends are protected from handling damage, but they can be cleaned if necessary after installation.

Extensive tests of the connectors, indicate that losses predominantly fall in the 0.5 dB to 1.0 range for 125 micron diameter, graded index fiber.

Other modifications to the invention will become apparent to those ordinarily skilled in the art, without departing from the spirit and scope of this invention as defined by the appended claims.

What is claimed is:

1. A fiber optic connector comprising:
   (a) a first connector body having a fiber engaging face and
      (i) a longitudinal groove along said face of said first connector body;
      (ii) A plurality of transverse slots spaced along said groove;
      (iii) body engaging means; and
      (iv) reference means associated with said groove for indicating where a face of a first fiber to be coupled should be aligned;
   (b) a first end cap means having a face for engaging a portion of said first connector body; and
      (i) a longitudinal protuberance along said engaging face of said first end cap means, said protuberance corresponding in size and shape to said groove; and
      (ii) a plurality of transverse inverted fingers spaced along said protuberance;
   (c) a second connector body having a fiber engaging face and
      (i) a longitudinal protuberance along said face of said second connector body;
      (ii) a plurality of transverse inverted fingers spaced along said second connector body protuberance
      (iii) body engaging means;
      (iv) reference means associated with said second body protuberance for indicating where a face of a second fiber to be coupled should be aligned; and
   (d) a second end cap means having a face for engaging a portion of said second connector body and
      (i) a raised longitudinal extension having a groove therein along said face of said second end cap; and
      (ii) a plurality of transverse slots spaced along said second end cap means groove; and wherein upon proper mating of said first connector body with said second connecto. body, said body engaging means of said fir<sup>-+</sup> connector body engages with said second connector body, and said body engaging means of said second connector body engages with said first connector body.

2. A fiber optic connector comprising:
   (a) A first connector body having a fiber engaging face and (i) a longitudinal recessed V-shaped groove along said face of said first connector body;

(ii) a plurality of rectangular transverse slots spaced along said groove, said slots extending to a depth exceeding said groove;

(iii) a first body engaging section;

(iv) first spring clip means affixed to said first body; and (v) reference means associated with said groove for indicating where a face of a first fiber to be coupled should be aligned;

(b) a first end cap means having a face for engaging a portion of said first connector body, and (i) a longitudinal extended V-shaped protuberance along said engaging face of said first end cap means, said extended V-shaped protuberance corresponding in size and shape to said recessed V-shaped groove; and (ii) a plurality of rectangular transverse inverted V-shaped fingers spaced along said protuberance, said fingers having a length not exceeding said depth of said slots;

(c) a second connector body having a fiber engaging face and (i) a longitudinal extended V-shaped protuberance along said face of said second connector body;

(ii) a plurality of rectangular transverse inverted V-shaped fingers spaced along said second connector body protuberance, said latter fingers extending a distance beyond said second protuberance;

(iii) a second body engaging portion, adapted to engage with said first body engaging portion when said first connector body and said second connector body are brought together and said engaging portions are in proper alignment.

(iv) second spring clip means affixed to said second body; and (v) reference means associated with said second body protuberance for indicating where a face of a second fiber to be coupled should be aligned; and (d) a second end cap means having a face for engaging a portion of said second connector body, and (i) a raised longitudinal extension having a V-shaped groove therein along said face of said second end cap; and (ii) a plurality of rectangular transverse slots spaced along, and extending to a depth beyond, said second end cap means V-shaped groove; and wherein:

upon proper mating of said first connector body with said second connector body, said first engaging portion engages with said second engaging portion, said first spring clip means affixed to said first body engages about said second end cap means and clips said second connector body, and said second spring clip means affixed to said second body engages about said first end cap means and clips about said first connector body.

3. A method of affixing a first fiber to be coupled to a first connector body and a first end cap means as recited in claim 2 comprising:

(a) orienting said first fiber within said first connector body longitudinal recessed groove and aligning said fiber so that a face thereof is aligned with said first connector body reference means;

(b) applying epoxy to said fiber within said groove; and (c) applying said first end cap means to engage said first connector body so that said epoxy joins said first end cap means to said fiber and said epoxy joins said fiber to said first connector body.

4. A method of affixing a first fiber to be coupled to a first connector body and a first end cap means, and of affixing a second fiber to be coupled to a second connector body and a second end cap means, all elements as recited in claim 2, said method comprising:

(a) orienting said first fiber within said first connector body longitudinal recessed groove and aligning said first fiber so that a face thereof is aligned with said first connector body reference means;

(b) applying epoxy to said first fiber within said first connector body groove;

(c) applying said first end cap means to engage said first connector body so that said epoxy joins said first end cap means to said first fiber and said epoxy joins said first fiber to said first connector body;

(c) orienting said second fiber within said second connector body V-shaped fingers and aligning said second fiber so that a face thereof is aligned with said second connector body reference means;

(e) applying epoxy to said second fiber within said second connector body V-shaped fingers; and (f) applying said second end cap means to engage said second connector body so that said epoxy joins said second end cap means to said second fiber and said epoxy joins said second fiber to said second connector body.

* * * * *